(12) United States Patent
Shirriff

(10) Patent No.: US 6,925,492 B2
(45) Date of Patent: Aug. 2, 2005

(54) METHOD AND APPARATUS FOR AUTOMATIC CONFIGURATION OF A CLUSTER OF COMPUTERS

(75) Inventor: Kenneth W. Shirriff, Redwood City, CA (US)

(73) Assignee: Sun Microsystems, Inc, Santa Clara, CA (US)

( * ) Notice: Subject to any disclaimer, the term of this patent is extended or adjusted under 35 U.S.C. 154(b) by 939 days.

(21) Appl. No.: 09/891,597

(22) Filed: Jun. 25, 2001

(65) Prior Publication Data

US 2002/0198968 A1 Dec. 26, 2002

(51) Int. Cl.[7] .................. G06F 15/177; G06F 15/173
(52) U.S. Cl. ................ 709/220; 709/222; 709/223
(58) Field of Search ............... 709/220, 222, 709/223, 226; 712/1, 28, 29

(56) References Cited

U.S. PATENT DOCUMENTS

| | | | |
|---|---|---|---|
| 5,371,852 A | * 12/1994 | Attanasio et al. | 709/245 |
| 5,822,531 A | * 10/1998 | Gorczyca et al. | 709/221 |
| 6,212,558 B1 | * 4/2001 | Antur et al. | 709/221 |
| 6,393,485 B1 | * 5/2002 | Chao et al. | 709/231 |
| 6,456,600 B1 | * 9/2002 | Rochberger et al. | 370/255 |
| 6,539,425 B1 | * 3/2003 | Stevens et al. | 709/220 |
| 6,618,757 B1 | * 9/2003 | Babbitt et al. | 709/226 |
| 6,654,796 B1 | * 11/2003 | Slater et al. | 709/220 |
| 6,665,304 B2 | * 12/2003 | Beck et al. | 370/401 |
| 6,701,357 B1 | * 3/2004 | Astarabadi et al. | 709/220 |
| 6,725,261 B1 | * 4/2004 | Novaes et al. | 709/220 |
| 6,754,729 B1 | * 6/2004 | Hass et al. | 710/14 |
| 6,857,012 B2 | * 2/2005 | Sim et al. | 709/222 |

* cited by examiner

*Primary Examiner*—Jeffrey A. Gaffin
*Assistant Examiner*—David Martinez
(74) *Attorney, Agent, or Firm*—Park, Vaughan & Fleming, LLP

(57) ABSTRACT

One embodiment of the present invention provides a system that facilitates configuring the network interfaces coupling together a group of computers. The system operates by receiving a request at a computer to configure the group of computers into a cluster of computers that function in concert as a single unit. Next, the system establishes whether each network interface within the computer is private or public, wherein a private network interface is used for intercommunications within the cluster of computers and a public network interface is used for communications with client computers. Using the private interconnects, the system determines the connectivity among the plurality of computers. Next, the system calculates a configuration for the cluster of computers. This configuration is presented to an administrator, which allows the administrator to edit the configuration to establish a more desirable configuration. Finally, the cluster of computers is installed using the configuration.

27 Claims, 7 Drawing Sheets

|  |  | FROM NODE 1 | | | FROM NODE 2 | | | FROM NODE 3 | | | FROM NODE X | |
|---|---|---|---|---|---|---|---|---|---|---|---|---|
|  |  | qfe0 | qfe1 | hme0 | qfe0 | qfe1 | hme0 | qfe0 | qfe1 | hme0 | hme1 |  |
| NODE 1 | qfe0 |  |  |  | X |  |  | X |  |  |  |  |
|  | qfe1 |  |  |  |  | X |  |  | X |  | X |  |
|  | hme0 |  |  |  |  |  | X |  |  | X |  |  |

FIG. 2A

|  |  | FROM NODE 1 | | | FROM NODE 2 | | | FROM NODE 3 | | | FROM NODE X | |
|---|---|---|---|---|---|---|---|---|---|---|---|---|
|  |  | qfe0 | qfe1 | hme0 | qfe0 | qfe1 | hme0 | qfe0 | qfe1 | hme0 | hme1 |  |
| NODE 2 | qfe0 | X |  |  |  |  |  | X |  |  |  |  |
|  | qfe1 |  | X |  |  |  |  |  | X |  | X |  |
|  | hme0 |  |  | X |  |  |  |  |  | X |  |  |

FIG. 2B

|  |  | FROM NODE 1 | | | FROM NODE 2 | | | FROM NODE 3 | | | FROM NODE X | |
|---|---|---|---|---|---|---|---|---|---|---|---|---|
|  |  | qfe0 | qfe1 | hme0 | qfe0 | qfe1 | hme0 | qfe0 | qfe1 | hme0 | hme1 |  |
| NODE 3 | qfe0 | X |  |  | X |  |  |  |  |  |  |  |
|  | qfe1 |  | X |  |  | X |  |  |  |  | X |  |
|  | hme0 |  |  | X |  |  | X |  |  |  |  |  |

FIG. 2C

|  |  | FROM NODE 1 | | | FROM NODE 2 | | | FROM NODE 3 | | | FROM NODE X | |
|---|---|---|---|---|---|---|---|---|---|---|---|---|
|  |  | qfe0 | qfe1 | hme0 | qfe0 | qfe1 | hme0 | qfe0 | qfe1 | hme0 | hme1 |  |
| NODE X | hme1 |  | X |  |  | X |  |  | X |  |  |  |
|  |  |  |  |  |  |  |  |  |  |  |  |  |

FIG. 2D

|  |  | FROM NODE 1 | | | FROM NODE 2 | | | FROM NODE 3 | | | FROM NODE X | |
|---|---|---|---|---|---|---|---|---|---|---|---|---|
|  |  | qfe0 | qfe1 | hme0 | qfe0 | qfe1 | hme0 | qfe0 | qfe1 | hme0 | hme1 | |
| NODE 1 | qfe0 |  |  |  | X |  |  | X |  |  |  |  |
|  | qfe1 |  |  |  |  | X |  |  | X |  | X |  |
|  | hme0 |  |  |  |  |  | X |  |  | X |  |  |
| NODE 2 | qfe0 | X |  |  |  |  |  | X |  |  |  |  |
|  | qfe1 |  | X |  |  |  |  |  | X |  | X |  |
|  | hme0 |  |  | X |  |  |  |  |  | X |  |  |
| NODE 3 | qfe0 | X |  |  | X |  |  |  |  |  |  |  |
|  | qfe1 |  | X |  |  | X |  |  |  |  | X |  |
|  | hme0 |  |  | X |  |  | X |  |  |  |  |  |
| NODE X | hme1 |  | X |  |  | X |  |  | X |  |  |  |
|  |  |  |  |  |  |  |  |  |  |  |  |  |

FIG. 2E

METHOD AND APPARATUS FOR AUTOMATIC CONFIGURATION OF A CLUSTER OF COMPUTERS

BACKGROUND

1. Field of the Invention

The present invention relates to computer clusters. More specifically, the present invention relates to a method and apparatus for automatic configuration of networking for computer clusters.

2. Related Art

Corporate intranets and the Internet are coupling more and more computers together to provide computer users with an ever widening array of tools. Many of these tools follow the client-server model in which a client communicates with a server to have the server perform an action for the client or provide data to the client. A server may have to provide these services to many clients simultaneously and, therefore, must be fast and reliable.

In an effort to provide speed and reliability within servers, designers have developed clustering systems for the servers. Clustering systems couple multiple computers together to function as a single unit. Multiple networks can be used to couple together the individual computers—also called nodes—within a cluster. The networks that are used to couple the individual computers within a cluster are referred to as "private interconnects." Additionally, multiple networks may be used to couple the nodes to the outside world, either by coupling the nodes to a corporate intranet or the Internet, or by coupling the nodes to computers that are not part of the cluster. These external networks are referred to as "public interconnects."

Thus, each node in a cluster may have multiple network interfaces, which may be coupled together in complex topologies. For instance, in a two-node cluster, a network interface in the first node may be directly coupled to a network interface in the second node. In a larger cluster, however, a network interface on each node may be coupled to a hub or switch. In many cases, the nodes will be coupled using multiple hubs or switches to ensure that the failure of a single hub or switch does not cause failure of the entire cluster.

Software that controls a clustering system requires knowledge of how the network interfaces are coupled within the cluster, so that the software can direct network traffic appropriately. The clustering software also requires this knowledge in order to detect failures within the cluster. Typically, failures are detected by using a heartbeat mechanism, which periodically sends messages between nodes. Failure of these heartbeat messages to get through the network for an extended period of time can indicate a failure within the cluster. One typical requirement is that each node be connected to each other node through two private networks, so the cluster can keep operating in the event of a network failure. Other configurations are possible, such as requiring only one, or more than two private networks.

The process of cluster initialization can present a number of challenges. In a typical implementation, when a user first installs the clustering software on a cluster of computers, the user must first specify the names of the nodes making up the cluster. Next, the user must manually specify the couplings among the various nodes within the cluster and the couplings to the external networks and devices. For example, the user would specify that the first private coupling includes the network interface designated hme0 on node 1, the network interface designated hme0 on node 2, and the network interface designated hme0 on node 3, all of which are coupled to a switch designated switch 1. This process must be repeated for each private interconnect in the cluster.

This process of specifying the interconnects among the nodes is time-consuming and error-prone. As the size of a cluster grows from two nodes or four nodes to thirty-two nodes, or more, the number of interconnects increases rapidly, thereby requiring considerable effort to properly configure the cluster. In addition, it is easy for a technician to incorrectly specify the interconnects within a cluster or to incorrectly connect the physical cables, which can cause the cluster to fail or to operate at reduced capacity or reliability.

What is needed is a method and apparatus that eliminates this error-prone and tedious manual specification of network interconnects within a cluster of computers.

SUMMARY

One embodiment of the present invention provides a system that facilitates configuring the network interfaces coupling together a group of computers. The system operates by receiving a request at a computer to configure the group of computers into a cluster of computers that function in concert as a single unit. Next, the system establishes whether each network interface within the computer is private or public, wherein a private network interface is used for intercommunications within the cluster of computers and a public network interface is used for communications with client computers. Using the private interconnects, the system determines the connectivity among the plurality of computers. Next, the system calculates a configuration for the cluster of computers. This configuration is presented to an administrator, which allows the administrator to edit the configuration to establish a more desirable configuration. Finally, the cluster of computers is installed using the configuration.

In one embodiment of the present invention, the system establishes whether the network interface is private or public by sending a broadcast ping message on the network interface. A ping message is a message that requests a response from a machine or machines on the network. It is typically implemented through an Internet control message protocol (ICMP) echo request. The system receives responses to the ping message on the network interface. The system also sends a router discovery message on the network interface. After sending the router discovery message, the system listens on the network interface for a response to the router discovery message. The system classifies the network interface as public or private based on the responses received. The system classifies the network interface as private if the number of responses to the ping message is less than or equal to the number of computers in a potential cluster and if no response was received from the router discovery message. Otherwise, the system classifies the network interface as public.

In one embodiment of the present invention, the system determines the connectivity among the plurality of computers by sending messages on the network interface that identifies the sending computer and the network interface. At the same time, the system listens for a response to the message on the network interface. Finally, the system creates a data structure containing a matrix of responses received for the network interface.

In one embodiment of the present invention, sending the message includes using a data link provider interface (DLPI).

In one embodiment of the present invention, the system calculates the membership of the cluster being formed by creating a list of all responding computers.

In one embodiment of the present invention, the system calculates the configuration for the cluster of computers by first requesting the matrix from each computer in the group of computers. Next, the system combines the matrix from each computer into a master matrix. The system examines the master matrix for a set of computers with at least two private network interfaces between them. The set of computers is then added to the cluster of computers.

In one embodiment of the present invention, the configuration is presented to the administrator by displaying the configuration on a web browser or displaying the configuration on a text-based display screen.

In one embodiment of the present invention, the system allows the administrator to edit the configuration. First, the system accepts a change to the configuration from the administrator. Next, the system verifies that the change to the configuration does not violate any established rule for the configuration. Finally, if the change to the configuration is valid, the system incorporates the change into the configuration.

In one embodiment of the present invention, the system passes the configuration to a configuration program for configuration of the cluster.

In one embodiment of the present invention, the user specifies a network configuration first and then the system determines connectivity and verifies that the user's configuration is valid.

BRIEF DESCRIPTION OF THE FIGURES

FIG. 2A is a matrix illustrating the connectivity as seen from computer 102 of cluster 100 in accordance with an embodiment of the present invention.

FIG. 2B is a matrix illustrating the connectivity as seen from computer 122 of cluster 100 in accordance with an embodiment of the present invention.

FIG. 2C is a matrix illustrating the connectivity as seen from computer 142 of cluster 100 in accordance with an embodiment of the present invention.

FIG. 2D is a matrix illustrating the connectivity as seen from computer 156 in accordance with an embodiment of the present invention.

FIG. 2E is a master matrix illustrating the connectivity of all coupled computers in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Devices

Figure 1:
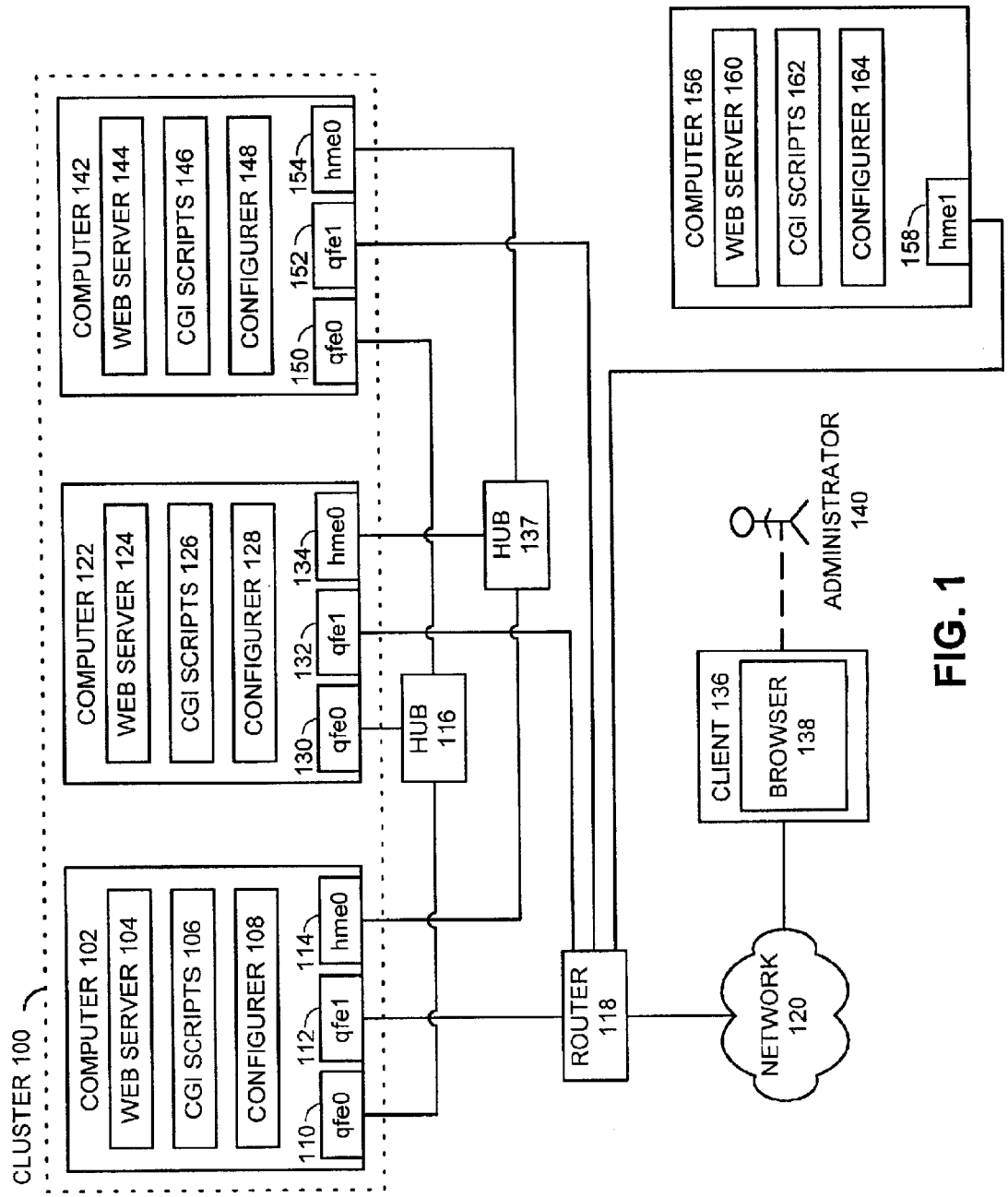
FIG. 1 illustrates computers coupled together in accordance with an embodiment of the present invention.

FIG. 1 illustrates computers coupled together in accordance with an embodiment of the present invention. Cluster 100 includes computers 102, 122, and 142. This description is not intended to limit cluster 100 to three computers. Indeed, any number of computers can be used to form a cluster as will be evident to a practitioner of ordinary skill in the art.

Computers 102, 122, and 142 can generally include any type of computer system, including, but not limited to, a computer system based on a microprocessor, a mainframe computer, a digital signal processor, a portable computing device, a personal organizer, a device controller, and a computational engine within an appliance.

Computer 102 includes web server 104, CGI scripts 106, and configurer 108. Computer 102 also includes network interfaces 110, 112, and 114 identified as qfe0, qfe1, and hme0 respectively. Computer 122 includes web server 124, CGI scripts 126, and configurer 128. Computer 122 also includes network interfaces 130, 132, and 134 identified as qfe0, qfe1, and hme0 respectively. Computer 142 includes web server 144, CGI scripts 146, and configurer 148. Computer 142 also includes network interfaces 150, 152, and 154, identified as qfe0, qfe1, and hme0, respectively. In general, any node computers included in cluster 100 will be configured similar to computers 102, 122, and 142.

Network interfaces 110, 130, and 150 are coupled together by hub 116 forming a private network. Network interfaces 114, 134, and 154 are coupled together by hub 137 forming a second private network. Network interfaces 112, 132, and 152 are coupled together by router 118. Router 118 also couples to network interface 158 of computer 156 and to network 120. The couplings to router 118 are public interfaces. Typically, the nodes of a cluster are coupled through at least two private interfaces and one or more public interfaces. Computer 156 represents a cluster node that is not part of the cluster under discussion but is coupled via a network to the cluster. There may be no, or multiple computers of this sort. Computer 156 includes web server 160, CGI scripts 162, and configurer 164, and is configured similar to computer 102, however, computer 156 does not share any private interfaces with the computers of cluster 100.

Network 120 can generally include any type of wire or wireless communication channel capable of coupling together computing nodes. This includes, but is not limited to, a local area network, a wide area network, or a combination of networks. In one embodiment of the present invention, network 120 includes the Internet.

Client 136 couples to network 120 and allows administrator 140 to access cluster 100 across network 120. Client 136 can generally include any type of computer system, including, but not limited to, a computer system based on a microprocessor, a mainframe computer, a digital signal processor, a portable computing device, a personal organizer, a device controller, and a computational engine within an appliance. Client 136 includes browser 138 for displaying web pages from web servers 104, 124, and 144. Note that the web browser can be replaced by a command line entry system.

Web servers 104, 124, and 144 are configured to communicate with browser 138 to present web pages to administrator 140. CGI scripts 106, 126, and 146 allow administrator 140 to enter data into the system to control the configuration process. Typically, administrator 140 communicates with only one computer, computer 102 for example. Computer 102 then communicates with computer 122 and computer 142 to control the configuration process. Configurers 108, 128, and 148 perform the configuration of computer 102, computer 122, and computer 142 respectively.

Computer Connectivity

During operation of the system, each node sends a message on each network interface to discover which nodes can communicate on that network interface and which network interface is being used on the other node. Each node creates a matrix indicating the connectivity from that node. Upon request from one of the nodes, say computer 102, each node communicates its matrix to that node so that the matrices can be combined into a master matrix.

FIG. 2A is a matrix illustrating the connectivity as seen from computer 102 of cluster 100 in accordance with an embodiment of the present invention. Note that in FIG. 2A through FIG. 2E, node 1 refers to computer 102, node 2 refers to computer 122, node 3 refers to computer 142, and node X refers to computer 156. The qfe0 network interface 110 of computer 102 can communicate with the qfe0 network interface 130 of computer 122, and with the qfe0 network interface 150 of computer 142. The qfe1 network interface 112 of computer 102 can communicate with the qfe1 network interface 132 of computer 122, with the qfe1 network interface 152 of computer 142, and with the hme1 network interface 158 of computer 156. The hme0 network interface 114 of computer 102 can communicate with the hme0 network interface 134 of computer 122, and with the hme0 network interface 154 of computer 142.

FIG. 2B is a matrix illustrating the connectivity as seen from computer 122 of cluster 100 in accordance with an embodiment of the present invention. The qfe0 network interface 130 of computer 122 can communicate with the qfe0 network interface 110 of computer 102, and with the qfe0 network interface 150 of computer 142. The qfe1 network interface 132 of computer 122 can communicate with the qfe1 network interface 112 of computer 102, with the qfe1 network interface 152 of computer 142, and with the hme1 network interface 158 of computer 156. The hme0 network interface 134 of computer 122 can communicate with the hme0 network interface 114 of computer 102, and with the hme0 network interface 154 of computer 142.

FIG. 2C is a matrix illustrating the connectivity as seen from computer 142 of cluster 100 in accordance with an embodiment of the present invention. The qfe0 network interface 150 of computer 142 can communicate with the qfe0 network interface 110 of computer 102, and with the qfe0 network interface 130 of computer 122. The qfe1 network interface 152 of computer 142 can communicate with the qfe1 network interface 112 of computer 102, with the qfe1 network interface 132 of computer 122, and with the hme1 network interface 158 of computer 156. The hme0 network interface 154 of computer 142 can communicate with the hme0 network interface 114 of computer 102, and with the hme0 network interface 134 of computer 122.

FIG. 2D is a matrix illustrating the connectivity as seen from computer 156 in accordance with an embodiment of the present invention. The hme1 network interface 158 of computer 156 can communicate with the qfe1 network interface 112 of computer 102, with the qfe1 network interface 132 of computer 122, and with the qfe1 network interface 152 of computer 142.

FIG. 2E is a master matrix illustrating the connectivity of all coupled computers in accordance with an embodiment of the present invention. In operation, administrator 140 communicates with one of the node computers, say computer 102. Computer 102 then requests the partial matrix from each participating node and combines them all into a single master matrix showing the total connectivity of the system.

Interface Classification

Figure 3:
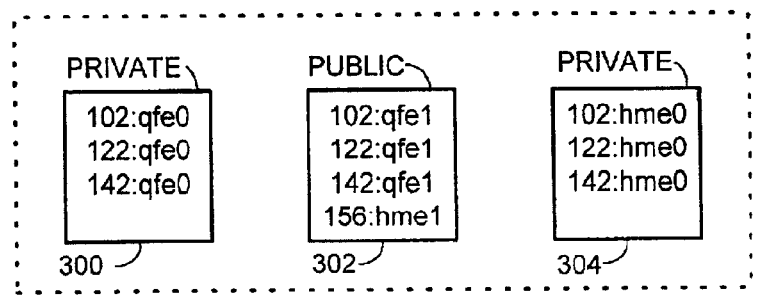
FIG. 3 illustrates classifying network interfaces as private or public in accordance with an embodiment of the present invention.

FIG. 3 illustrates classifying network interfaces as private or public in accordance with an embodiment of the present invention. In operation, the system classifies each network interface as private or public. Details of the classification are described below in conjunction with FIG. 4. In the current example, there are three networks. Network 300, which includes qfe0 network interface 110 on computer 102, qfe0 network interface 130 on computer 122, and qfe0 network interface 150 on computer 142, is classified as a private network. Likewise, network 304, which includes hme0 network interface 114 on computer 102, hme0 network interface 134 on computer 122, and hme0 network interface 154 on computer 142, is classified as a private network. However, network 302, which includes qfe1 network interface 112 on computer 102, qfe1 network interface 132 on computer 122, qfe1 network interface 152 on computer 142, and hme1 network interface 158 on computer 156, is classified as a public network.

Classifying as Private or Public

Figure 4:
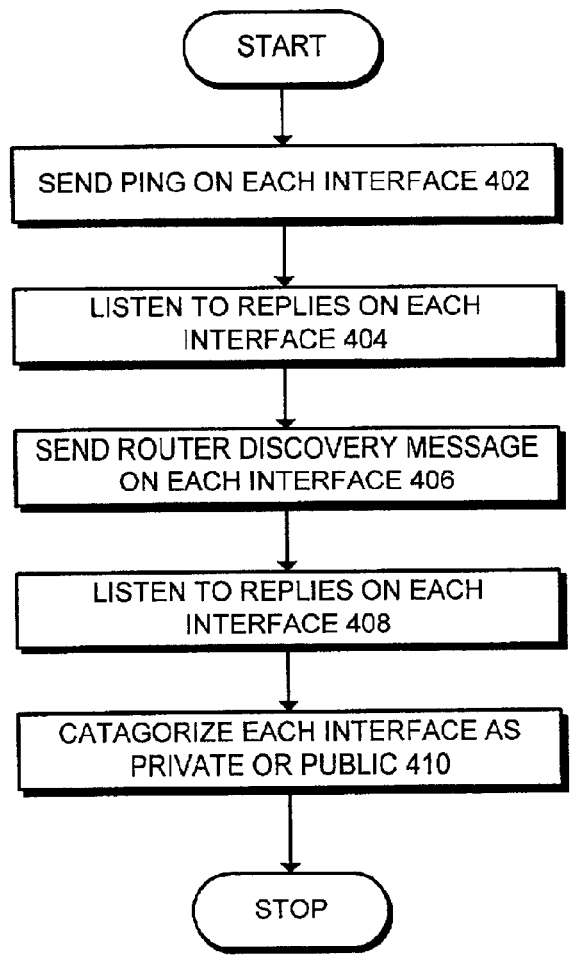
FIG. 4 is a flowchart illustrating the process of determining if a network interface is private or public in accordance with an embodiment of the present invention.

FIG. 4 is a flowchart illustrating the process of determining if a network interface is private or public in accordance with an embodiment of the present invention. Each node in the system operates in a similar manner so only the actions of computer 102 will be described. The system starts when computer 102 sends out a ping on network interfaces 110, 112, and 114 (step 402). Next, computer 102 listens to the replies to the ping message on network interfaces 110, 112, and 114 (step 404).

After receiving the replies to the ping message, computer 102 sends a router discovery message on network interfaces 110, 112, and 114 (step 406). Next, computer 102 listens for replies to the router discovery message on network interfaces 110, 112, and 114 (step 408).

Finally, computer 102 classifies each interface as private or public (step 410). Note that a private network has very few responses to the ping message and no responses to the router discovery message, while a public network has many replies to the ping message and typically has a response to the router discovery message.

Determining Interconnectivity

Figure 5:
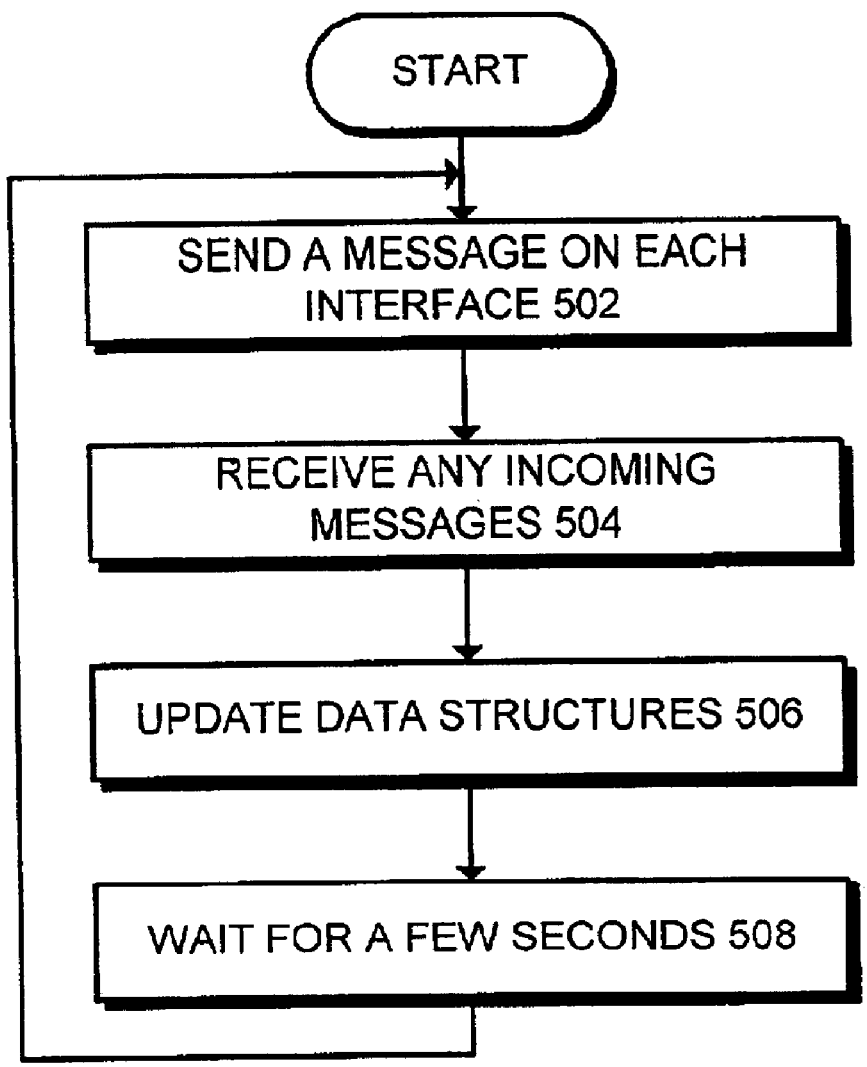
FIG. 5 is a flowchart illustrating the process of determining the interconnectivity of computers in accordance with an embodiment of the present invention.

FIG. 5 is a flowchart illustrating the process of determining the interconnectivity of computers in accordance with an embodiment of the present invention. Each node in the system operates in a similar manner so only the actions of computer 102 will be described. Computer 102 sends a message on network interfaces 110, 112, and 114 identifying the sending node and the network interface identification (step 502). After sending the message, computer 102 receives incoming messages from the responding nodes (step 504). The messages from the responding nodes identify the responding node and the network interface on the responding node. Next, computer 102 updates the connectivity matrix (step 506). Finally, computer 102 waits for a few seconds and repeats the process from 502 (step 508). This process can be continued for a length of time sufficient for all nodes to communicate.

Cluster Configuration

Figure 6:
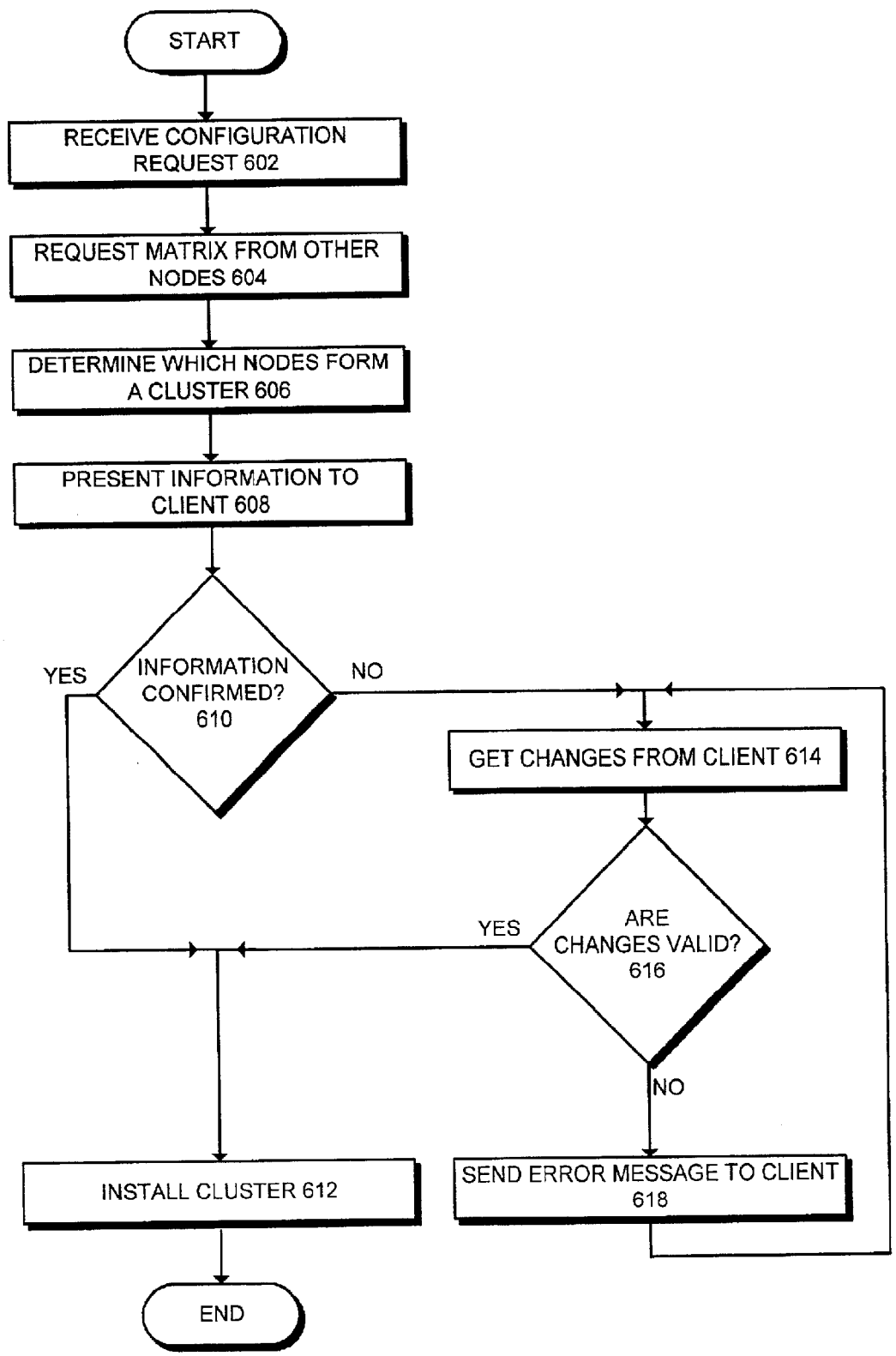
FIG. 6 is a flowchart illustrating the process of configuring cluster 100 in accordance with an embodiment of the present invention.

FIG. 6 is a flowchart illustrating the process of configuring cluster 100 in accordance with an embodiment of the present invention. The system starts when a node computer, say computer 102, receives a configuration request from administrator 140 (step 602). In response to the request, computer 102 requests and receives the partial matrix from the other nodes in the cluster and creates the master matrix (step 604).

After creating the master matrix, computer 102 determines which nodes form a cluster (step 606). In one embodiment of the present invention, a cluster consists of a set of nodes for which each node can communicate with each other node via two private networks. This set can be obtained by using well-known graph algorithms. For instance, a strongly connected subcomponent graph can be generated from the matrix, and then all nodes verified to have two private connections. Computer 102 creates a proposed cluster configuration and presents the information to administrator 140 through client 136 (step 608).

Next, administrator 140 either confirms the configuration or requests to make manual changes to the configuration (step 610). If administrator 140 confirms the configuration, configurer 108 installs the cluster (step 612).

If administrator 140 requests to make manual changes at 610, computer 102 receives the changes from client 136 (step 614). Next, computer 102 determines if the changes form a valid cluster (step 616). Note that the changes must comply with the requirements for a valid cluster such as having at least two private networks coupling each node in the cluster. If the changes are valid at 616, configurer 108 installs the cluster, otherwise, computer 102 sends an error message to client 136 (step 618). After sending the error message, the process returns to 614 to get additional changes from client 136.

Forming a Cluster

Figure 7:
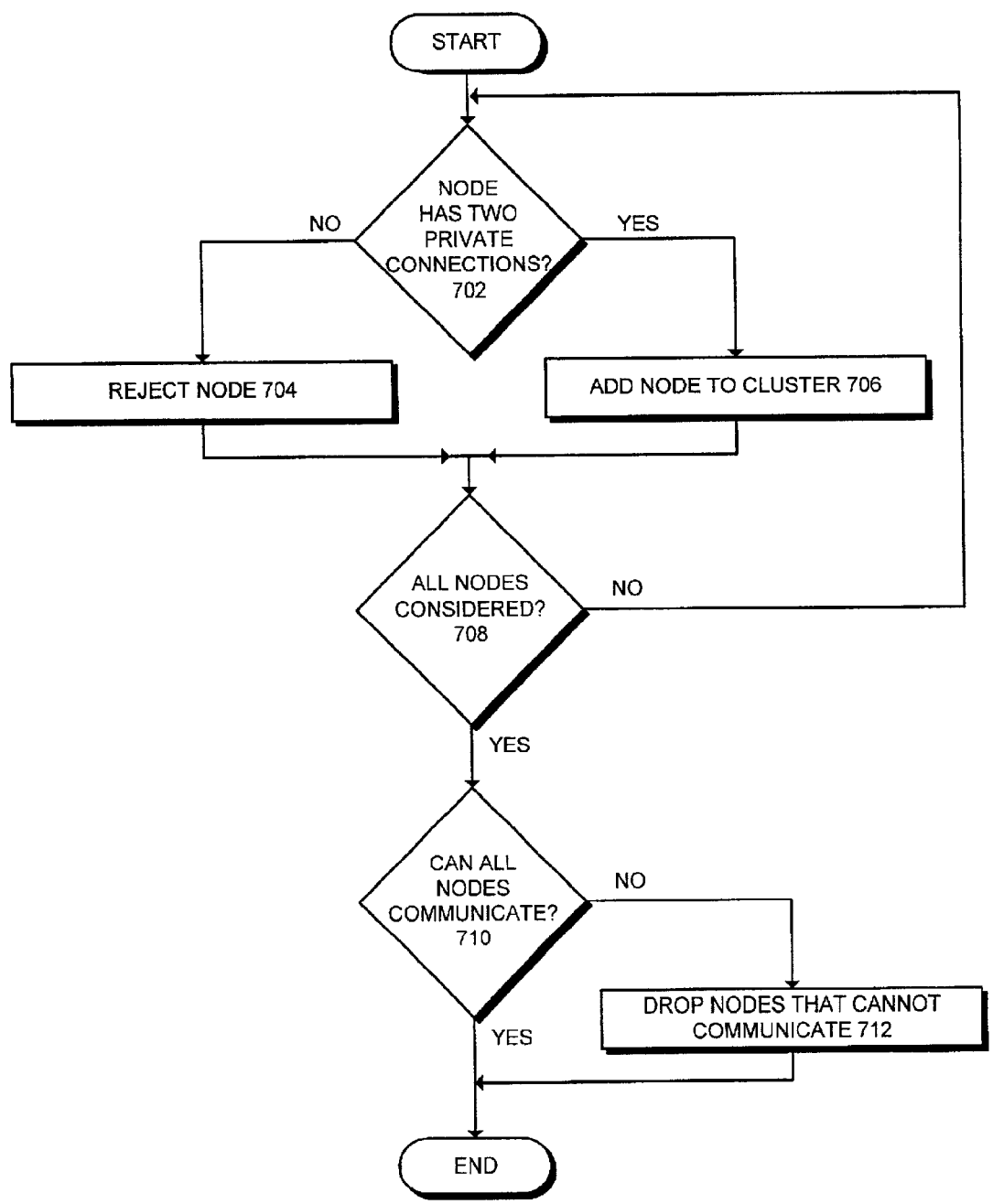
FIG. 7 is a flowchart illustrating the process of determining which nodes can form a cluster in accordance with an embodiment of the present invention.

FIG. 7 is a flowchart illustrating the process of determining which nodes can form a cluster in accordance with an embodiment of the present invention. The system starts when the node computer selected by administrator 140, say computer 102, examines the connectivity to another node to determine if the node has two private interconnects with computer 102 (step 702). If there are not two private interconnects the node is rejected as a member of the cluster (step 704). If there are at least two private interconnects, the node is added to the cluster (step 706).

Next, computer 102 determines if all potential nodes have been considered (step 708). If all potential nodes have not been considered, the process resumes from 702. If all potential nodes have been considered, computer 102 tests to see if all nodes can communicate on at least two private networks (step 710). If a node cannot communicate on at least two private networks, the node is dropped from the cluster (step 712). Otherwise, the current configuration is available for presentation to administrator 140.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for configuring a plurality of network interfaces coupling a plurality of computers, comprising:

receiving a request at a computer of the plurality of computers to configure the plurality of computers into a cluster of computers, wherein the cluster of computers function in concert as a single unit;

establishing at the computer whether a network interface of the plurality of network interfaces is one of private and public, wherein a private network interface is used for intercommunications within the cluster of computers and a public network interface is used for communications with a client computer;

determining a connectivity among the plurality of computers;

calculating a configuration for the cluster of computers; and installing the cluster of computers using the configuration.

2. The method of claim 1, wherein establishing whether the network interface is one of private and public includes:

sending a ping message on the network interface;

receiving a plurality of responses to the ping message on the network interface;

sending a router discovery message on the network interface;

listening on the network interface for a response to the router discovery message; and classifying the network interface as public or private based on responses received, wherein the network interface is classified as private if a number of responses to the ping message is less than or equal to a number of computers in the cluster and if no response was received from the router discovery message, otherwise classifying the network interface as public.

3. The method of claim 1, wherein determining the connectivity among the plurality of computers includes:

sending a message on the network interface, wherein the message identifies a sending computer and the network interface;

listening for a response to the message on the network interface; and creating a data structure containing a matrix of responses received for the network interface.

4. The method of claim 3, wherein sending the message includes using a data link provider interface (DLPI).

5. The method of claim 3, wherein calculating the configuration for the cluster of computers includes:

requesting the matrix from each computer in the plurality of computers;

combining the matrix from each computer into a master matrix;

examining the master matrix for a pair of computers with at least two private network interfaces; and adding the pair of computers to the cluster of computers.

6. The method of claim 1, further comprising:
presenting the configuration to an administrator; and
allowing the administrator to edit the configuration.

7. The method of claim 6, wherein presenting the configuration to the administrator includes one of displaying the configuration on a web browser and displaying the configuration on a text-based display screen.

8. The method of claim 7, wherein allowing the administrator to edit the configuration includes:
accepting a change to the configuration from the administrator;
verifying that the change to the configuration does not violate an established rule for the configuration; and
if the change to the configuration is valid, incorporating the change into the configuration.

9. The method of claim 8, further comprising passing the configuration to a configuration program for configuration of the cluster.

10. A computer-readable storage medium storing instructions that when executed by a computing device causes the computing device to perform a method for configuring a plurality of network interfaces coupling a plurality of computers, the method comprising:
receiving a request at a computer of the plurality of computers to configure the plurality of computers into a cluster of computers, wherein the cluster of computers function in concert as a single unit;
establishing at the computer whether a network interface of the plurality of network interfaces is one of private and public, wherein a private network interface is used for intercommunications within the cluster of computers and a public network interface is used for communications with a client computer;
determining a connectivity among the plurality of computers;
calculating a configuration for the cluster of computers; and
installing the cluster of computers using the configuration.

11. The computer-readable storage medium of claim 10, wherein establishing whether the network interface is one of private and public includes:
sending a ping message on the network interface;
receiving a plurality of responses to the ping message on the network interface;
sending a router discovery message on the network interface;
listening on the network interface for a response to the router discovery message; and
classifying the network interface as public or private based on responses received, wherein the network interface is classified as private if a number of responses to the ping message is less than or equal to a number of computers in the cluster and if no response was received from the router discovery message, otherwise classifying the network interface as public.

12. The computer-readable storage medium of claim 10, wherein determining the connectivity among the plurality of computers includes:
sending a message on the network interface, wherein the message identifies a sending computer and the network interface;
listening for a response to the message on the network interface; and
creating a data structure containing a matrix of responses received for the network interface.

13. The computer-readable storage medium of claim 12, wherein sending the message includes using a data link provider interface (DLPI).

14. The computer-readable storage medium of claim 12, wherein calculating the configuration for the cluster of computers includes:
requesting the matrix from each computer in the plurality of computers;
combining the matrix from each computer into a master matrix;
examining the master matrix for a pair of computers with at least two private network interfaces; and
adding the pair of computers to the cluster of computers.

15. The computer-readable storage medium of claim 10, the method further comprising:
presenting the configuration to an administrator; and
allowing the administrator to edit the configuration.

16. The computer-readable storage medium of claim 15, wherein presenting the configuration to the administrator includes one of displaying the configuration on a web browser and displaying the configuration on a text-based display screen.

17. The computer-readable storage medium of claim 16, wherein allowing the administrator to edit the configuration includes:
accepting a change to the configuration from the administrator;
verifying that the change to the configuration does not violate an established rule for the configuration; and
if the change to the configuration is valid, incorporating the change into the configuration.

18. The computer-readable storage medium of claim 17, wherein the method further comprises passing the configuration to a configuration program for configuration of the cluster.

19. An apparatus that facilitates configuring a plurality of network interfaces coupling a plurality of computers, comprising:
a receiving mechanism configured to receive a request at a computer of the plurality of computers to configure the plurality of computers into a cluster of computers, wherein the cluster of computers function in concert as a single unit;
an establishing mechanism configured to establish at the computer whether a network interface of the plurality of network interfaces is one of private and public, wherein a private network interface is used for intercommunications within the cluster of computers and a public network interface is used for communications with a client computer;
a determining mechanism configured to determine a connectivity among the plurality of computers;
a calculating mechanism configured to calculate a configuration for the cluster of computers; and
an installing mechanism configured to install the cluster of computers using the configuration.

20. The apparatus of claim 19, further comprising:
a sending mechanism configured to send a ping message on the network interface;
a listening mechanism configured to receive a plurality of responses to the ping message on the network interface;
wherein the sending mechanism is further configured to send a router discovery message on the network interface;

wherein the listening mechanism is further configured to receive a response to the router discovery message on the network interface; and a classifying mechanism that is configured to classify the network interface as public or private based on responses received, wherein the network interface is classified as private if a number of responses to the ping message is less than or equal to a number of computers in the cluster and if no response was received from the router discovery message, otherwise classifying the network interface as public.

21. The apparatus of claim 19, further comprising:

a sending mechanism that is configured to send a message on the network interface, wherein the message identifies a sending computer and the network interface;

a listening mechanism that is configured to receive a response to the message on the network interface; and a creating mechanism that is configured to create a data structure containing a matrix of responses received for the network interface.

22. The apparatus of claim 21, wherein the sending mechanism is configured to use a data link provider interface (DLPI).

23. The apparatus of claim 21, further comprising:

a requesting mechanism that is configured to request the matrix from each computer in the plurality of computers;

a combining mechanism that is configured to combine the matrix from each computer into a master matrix;

an examining mechanism that is configured to examine the master matrix for a pair of computers with at least two private network interfaces; and an adding mechanism that is configured to add the pair of computers to the cluster of computers.

24. The apparatus of claim 19, further comprising:

a presentation mechanism configured to present the configuration to an administrator; and an editing mechanism configured to allow the administrator to edit the configuration.

25. The apparatus of claim 24, wherein the presentation mechanism is configured to present the configuration to the administrator by one of displaying the configuration on a web browser and displaying the configuration on a text-based display screen.

26. The apparatus of claim 25, further comprising:

an accepting mechanism that is configured to accept a change to the configuration from the administrator;

a verifying mechanism that is configured to verify that the change to the configuration does not violate an established rule for the configuration; and an incorporating mechanism that is configured to incorporate the change into the configuration, if the change to the configuration is valid.

27. The apparatus of claim 26, further comprising a passing mechanism configured to pass the configuration to a configuration program for configuration of the cluster.

* * * * *